United States Patent [19]
Wilmer

[11] 4,075,707
[45] Feb. 21, 1978

[54] PROGRAMMED DEVICE CONTROLLER

[75] Inventor: Michael E. Wilmer, Portola Valley, Calif.

[73] Assignee: Xerox Corporation, Stamford, Conn.

[21] Appl. No.: 688,653

[22] Filed: May 21, 1976

[51] Int. Cl.$^2$ .......................... G05B 11/01; G06F 9/00
[52] U.S. Cl. ...................................................... 364/900
[58] Field of Search ......................................... 364/900

[56] References Cited

U.S. PATENT DOCUMENTS

| | | | |
|---|---|---|---|
| 3,849,765 | 11/1974 | Hamano | 340/172.5 |
| 3,944,987 | 3/1976 | Koyanagi et al. | 340/172.5 |
| 3,996,565 | 12/1976 | Nakao et al. | 340/172.5 |

Primary Examiner—Raulfe B. Zache

Attorney, Agent, or Firm—M. J. Colitz, Jr.; T. J. Anderson; I. Keschner

[57] ABSTRACT

A processing system adapted to control a sequential automated device to a state determined by the immediately preceding state. The system comprises a read only memory (ROM) (or alternatively a static RAM) having coded at each address in bit positions 2 through $n$ the address of either the output signal to be controlled, the input signal to be sensed or the next ROM address. Bit position 0 indicates whether an output or input is to be selected and bit position 1 either determines the desired state of the input that is selected or routes the 2 through $n$ bit position address to select the output or to set a new address for the ROM. Accordingly bits 0 and 1 from the ROM are combined with the selected input in a logical circuit comprising gates and inverters to either increment the ROM address buffer or jump to a new address.

12 Claims, 4 Drawing Figures

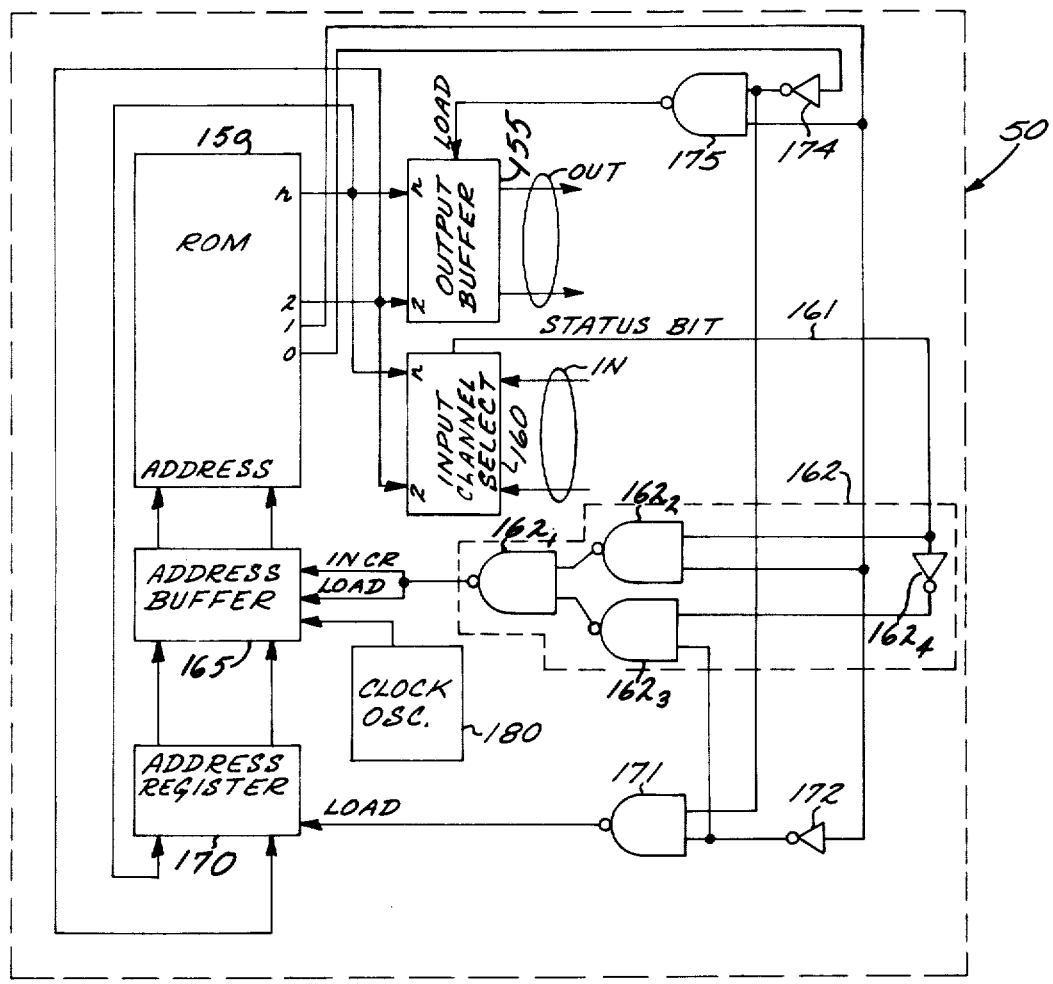
FIG. 3
FIG. 4
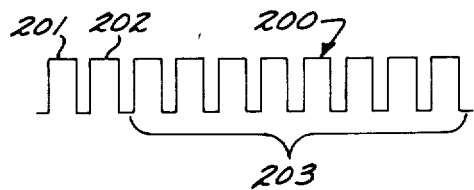

PROGRAMMED DEVICE CONTROLLER

BACKGROUND OF THE INVENTION

1. Field of the Invention

The present invention relates to special purpose microprocessors, and more particularly to a microprocessor adapted for use in controlling sequential devices.

2. Description of the Prior Art

One of the more recognized features of conventional microprocessors is their adaptability for use as logic devices. By proper coding a set of instruction sequences can logically control any device heretofore controlled by complex switching systems. With the decreasing cost of semiconductor chips and particularly the decreasing costs of fixed memory the use of microprocessors for this function has experienced wider acceptance. A typical microprocessor used as the control system in a mechanized device receives a plurality of binary inputs indicating the position of switches set by the operator, timer inputs and inputs describing the various states of the machine itself as it progresses through the selected sequence. The output is again typically binary providing the control signals to mechanisms like motors, clutches, brakes, or other devices. Generally, however, the structure of a microprocessor is configured for broad applications and for that reason logic elements unnecessary for control are included. In this broad form relatively complex instruction sequences are necessary and any control will necessarily entail considerable programming cost. Specifically it is the erasable memory in conjunction with the arithmetic logic unit (ALU) that heretofore has been at the heart of the logical sequences. The execution of a large instruction set through this arithmetic logic unit and with the aid of erasable memory is the primary source in the increased program complexity and, furthermore, the training level for the operator.

Sequential devices, in particular, operate on relatively straightforward logical decisions and the breadth of a typical microprocessor is therefore substantially excessive for these purposes. Furthermore, with the use of a read only memory (ROM) storing several well selected instructions no operation in the ALU is necessary, most of the logical decisions being capable of implementation in a few simple gates.

SUMMARY OF THE INVENTION

Accordingly it is the general purpose and object of the present invention to provide a limited processing device utilizing fixed semiconductor memory, which by simple address manipulation can control an automatic sequence.

Other objects of the invention are to provide a device controller which, in its program execution, is required to execute only four instructions.

Yet further objects of the invention are to provide a special purpose processor particularly adapted to control automatic devices.

Briefly, these and other objects are accomplished within the present invention by connecting a special purpose processor in a control loop around the controlled device. This processor may comprise a fixed, or read only, memory (or a programmed random access memory like a static RAM) as its central element presenting an output to the controlled device which is a function of the present and previous states of that same device. The architecture of the programmed controller is centered around this main memory element whereby in response to an address input developed at an address buffer a predetermined output is selected in an output buffer. The output of the latter buffer then controls the operation of the device. The various state (feedback) signals of the device are in turn applied to an input channel selector circuit, i.e., a decoder which decodes and selects one thereof according to the output signals from the programmed memory. Once a particular channel is thus selected it is then applied as a status bit to an exclusive OR circuit which concurrently receives a desired state (input) bit from the memory. The output of this exclusive OR circuit is then combined with one more bit of the memory output in a NAND gate which provides either a load signal or an address incrementing signal to an address buffer at the input to the memory. The latter two selected bits of the memory output are concurrently collected at yet another NAND gate which supplies a load signal to the output buffer if the bit state is correct. In the alternative these same two selected bits, one in inverted form, are collected in a third NAND gate to load an address register which provides the address input to the address buffer.

It is by way of these two selected bits that all of the instructions of the inventive controller are implemented. For convenience to the user in adapting the present controller to specific applications the resulting set of instructions may be expressed as memonics ITBT and ITBF (Input, Test and Branch - True and False) for the input set, OUT for the output buffer instruction and LOADADR to load the address register. In each instance the instruction is coupled with an argument or vector which for the first two selects the input variable to be tested, the third selects the output or control variable and the fourth sets the next memory address for program continuity.

Thus, by way of this processor architecture the only logical operations that take place is either the loading of the output buffer or address register and if the address register is loaded an incrementing operation is the only additional logical step. These are all normally very minor events in a typical microprocessor. Accordingly, the structure of the present system is significantly simpler, avoiding the logical arithmetic operations, when compared with a normal architecture of a present day microprocessor. With this simplicity the instruction set is similarly simple comprising only a most limited set of two dual mode instructions, the first being a true — false discrimination of a selected input variable, and the second being a dual mode output instruction. The test and branch operations are performed according to the state of the previously mentioned two selected bit positions of the ROM output and the status bit, where the first ROM bit designated herein as the OP code bit contains the desired function and the second the state of the status bit which the program wants to see. The address portion of the output buffer is then used to select the desired input variable through the input decoder. The second instruction type provides the data output or loads an internal address register which enables programmed branching.

During operations the processor selects the inputs for comparison in the exclusive OR circuit and if that bit is high, indicating the desired status and proper operation address incremention occurs in the normal course. If on the other hand there is a disparity between the two exclusive inputs to that exclusive OR gate the program branches to a new address now in the address buffer.

That new address then either selects a new output state, sets a new address in the address buffer or tests a new input variable. By way of this architecture binary conditions within the controlled device are checked in correlated relationship with the controlled event. Thus, for example, if the device is a device like a timed dryer, or a similar sequential device commonly used in a household, where the operation of one particular event is dependent on the completion of the prior event the inventive device controller provides a convenient technique to accommodate such a sequence. For example, the fan motor in a dryer must be at full speed, or be energized, before the heat is applied. These two conditions of state are accommodated within the two selected bits of the ROM. If the motor is on as indicated by the status bit selected through the input channel select the dryer is therefore ready for application of heat. The address incrementing sequence will be therefore allowed to advance to the heat application position.

BRIEF DESCRIPTION OF THE DRAWINGS

FIG. 3 is a logic diagram, at the chip level, illustrating one implementation of the device controller constructed according to the present invention; and FIG. 4 is a wave form schematic of a single ROM output word useful with the present invention.

DESCRIPTION OF THE SPECIFIC EMBODIMENT

While the following description presents the operation and structure of the inventive device controller in conjunction with a very limited drying device, such presentation is exemplary only. It is to be noted that by way of the mechanics described herein other, more complex, sequential devices can be implemented without departing from the spirit or the scope of the present invention.

Figure 1:
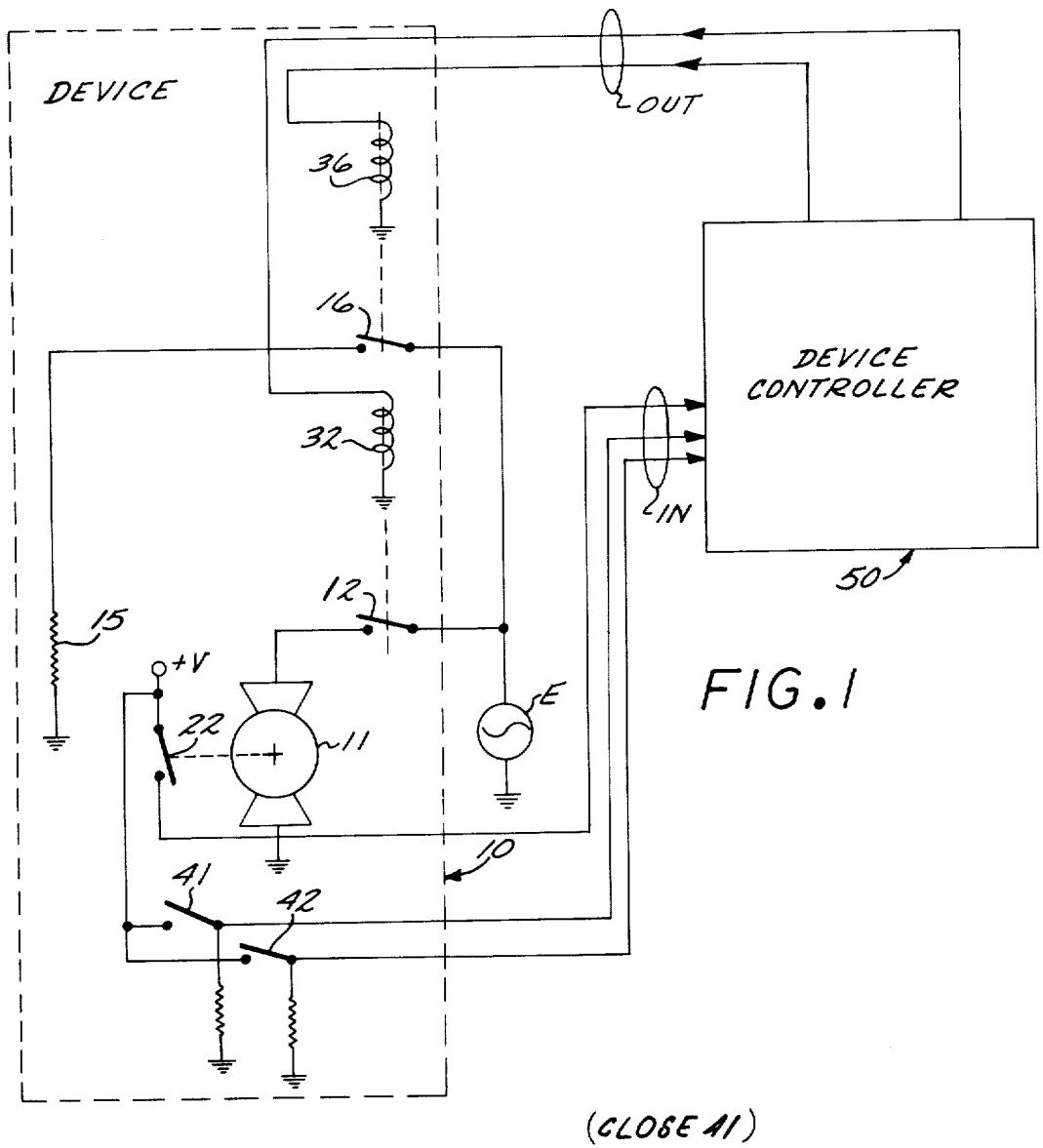
FIG. 1 is a block diagram illustration of a device utilizing a controller in its operation.

As shown in FIG. 1 a dryer, designated by the numeral 10, includes a motor 11 articulating either a blower or for example the tumbler assembly (not shown), motor 11 being tied to a source of electrical excitation E through a switch 12. Tied in parallel across source E is a heating filament 15 in series with yet another switch 16. As is conventionally practiced, the sequence of events that is mandatory in a dryer requires that motor 11 be energized before the filament 15 is excited. Thus switch 12 must be closed before any closure of switch 16 can be made. This mandated sequence of switch closures is typical in many devices and can accommodate sequences much more sophisticated than the one presented. The basic condition however is that switch 12 be closed before switch 16 is articulated to a closed position. Manual starting is signaled by closure of a start switch 42 and stopping is by a switch 41. While there are many various ways of detecting whether the motor is running or not, the simplest exemplary technique is to employ a common inertial switch on the motor shaft, designated as switch 22. Switches 22, 41, and 42 may in turn be connected in common to a source of logical signal shown herein as signal +V with the contacts thereof being brought out as a signal bunch labeled IN to provide the inputs to a device controller 50 constructed according to the present invention and described in more detail herein. It is precisely this device controller 50 that discriminates, or verifies, the necessary a priori condition before articulating switch 16.

The command to articulate is shown by way of a signal bunch labeled OUT emanating from the device controller 50 which is shown connected at exemplary signal leads thereof to a pair of solenoid windings 32 and 36, winding 32 articulating switch 12 and winding 36 articulating switch 16. This example set forth, in what is believed to be the simplest form, the required implementation of a control loop including the device controller 50. Again the use of a motor 11, for example, is illustrative only and by very convenient analogy this same motor 11 can be replaced by a timing disc to execute a conventional time out function. In the alternative devices like temperature indicators may be included in the system, expanding the flexibility and safety of the operations of the device 10. In each instance, however, there is a logical relationship between either the exemplary heater and the motor, or other devices, which heretofore has been implemented by complicated switching circuits or specifically made solid state logic. It is precisely this specially made limitation of either the switching or solid state logic that is now generalized by the invention herein. In addition the logic approach set forth below can be utilized to distinguish a broad selection of modes selected by manual controls or manually articulated switches accommodating a broad selection without any increase in hardware.

With the cost of manual labor being exceptionally high and particularly the labor entailed in making the various connections in any logical circuit the use of the recently developed programmable memories or PROMS is used to best advantage herein. Alternatively devices like a static RAM can be externally loaded through a DIP clip with the same result. Thus, a tested and therefore reliable logical sequence can be entered into a fixed memory device, like the read only memory, which can then control the various modes of operation of the device 10.

Figure 2:
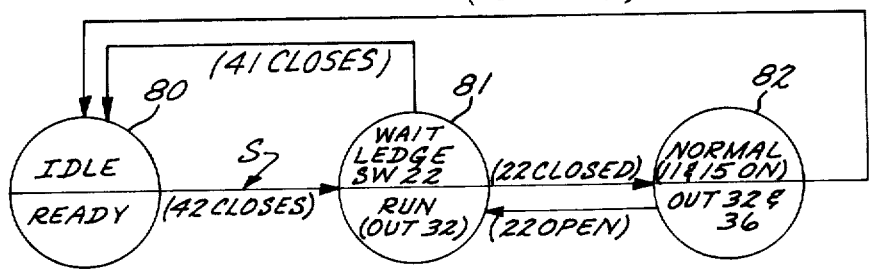
FIG. 2 is a state diagram typical of one of the sequential operations within the device shown in FIG. 1.

The above described sequence of exemplary logical operations can be formally presented as a state diagram as shown in FIG. 2. It is again to be noted that the presentation of this state diagram is exemplary only and sequences much more extensive then that illustrated will be within the skill and comprehension of competent logic designers. More specifically as shown in FIG. 2 the first state, labeled idle, represents that the machine is ready and is identified herein by the numeral 80. The output from node 80 is a path commencing the start-up of the motor 11 and identified by the letter S. This start-up begins at the closure of switch 42. The node representing start-up state is shown as node 81 and in this state the motor is energized by switch 12. The next node in series is node 82 which is selected if switch 22 is closed. In this state both motor (output 32) and heater (output 36) are energized. If the motor stops, this will be indicated by an opening of switch 22 which causes a return to state 81, removing power from the heater. The closure of switch 41 indicates a stop command and causes a return to state 80. In this manner any logical sequence desired can be symbolically laid out with the corresponding signal branches at each node. The signal branches in each instance typically entail a forward propagation to the next node or a branching progression to a new node. The result is that each node only has two conditions to consider, i.e., test the input and branch according to the state of the inputs involved and to provide the output. Each input instruction, therefore, will sample a particular input signal by making a unique address available from the read only memory to an external address decoder. The input is then decoded or selected to either advance to the next instruction in memory or to branch to another location in memory. Furthermore an unconditional branch can be accomplished by wiring a certain value of the decoder, for example data input address 000, to produce a True. Execution of the instruction Input Test and Branch True on 000 will produce an unconditional branch. Thus for an $n$ bit word length ROM there can be as many as $2n - 2 - 1$ input variables and $n-2$ output variables. Furthermore various input variables can be combined by the selective decoder as for example according to the following combination $A_{12} \times A_{13} \times A_{17}$. While this last operation may entail additional logic in the decoder portion of the device controller 50 the ROM is essentially left unchanged without any additional cost thereto.

With the foregoing general system operation a particular implementation will now be set forth with reference to FIG. 3. As shown in this figure the device controller 50 comprises as its central elements a ROM 150 providing in parallel $n$ number of output bits. The first two bits of that ROM, i.e., bits labeled as 0 and 1 are the above referenced selected bits which determine whether the state of an input is to be tested or not. Thus for example if bit 0 is set to "1" or logical True then the next bit 1 contains the state of the input variable which will cause a program branch to occur. Bits 2 through $n$ select this input variable. If on the other hand the 0 bit is "0", or logical False, the next higher bit or bit 1 position determines whether the address portion of the ROM output is to be placed in the address buffer or in the output state buffer.

More particularly shown tied in parallel to the 2 through $n$ ROM outputs is an output buffer 155 and an input channel select chip 160. Output buffer 155 can be any conventional register strobed to be loaded with the contents of the address bits of the ROM. The input channel select 160 however is a somewhat more complex circuit and can be found generally designated as a many to one decoder as for example a 4 to 1 data selector/multiplexer made by Texas Instruments under the model number SN 54251. This decoder or data selector will then enable internally a particular gate for the individual input variable and that gate is then brought out on a common status bit bus or lead 161. The status bit lead 161 is then collected as one of the inputs of an exclusive OR gate circuit 162 comprising a set of NAND gates 162$_1$, 162$_2$, 162$_3$, and an inverter 162$_4$ which, in the manner of an exclusive OR gate, concurrently receives the bit 1 output of ROM 150. Thus if the lead 161 is of the same state as the lead of bit 1 the output of gate 162 is low. The output of circuit 162 then provides the increment or load signals to an address buffer 165, clocked by an oscillator 80, which applies the next address to the ROM or increments directly, on the clock, the address. The initial address input to buffer 165 originates in an address register 170 which collects in parallel the next address provided in the ROM, i.e., bits 2 through $n$.

Register 170 is strobed for loading by a NAND gate 171 which collects the bit 1 the bit 0 outputs from the ROM 150, bit 0 being inverted through an inverter 172 and bit 1 through an inverter 174. It is this output that therefore will go high if while one bit is low the other bit is high. Concurrently bits 1 and 0 from ROM 150, bit 0 inverted through inverter 174, are applied to yet another NAND gate 175 which provides the load signal to the output buffer 155.

Buffer 155 then generates the signal previously identified as signal branch OUT while the input variable applied to the input channel select 160 are the same signal branch as was previously identified as signals IN. With this architecture the following modes of operation are set forth:

A. Upon initialization address buffer 165 is cleared thereby selecting the first word in the memory ROM 150 of which bits 2 through $n$ are an address which is available to the address register 170, to the input channel select 160 and to the output register 155.

B. The first instruction in memory is typically the first instruction of an initialization or idle state and therefore is an output instruction which provides an output data word corresponding to the idle condition. This is indicated by a "0" or logical False in bit position 0 with a "0" or logical False in bit position 1. When these two bits are False, the output buffer will be loaded with bits 2 through $n$ of the ROM word and the memory address buffer 165 will be incremented by one.

C. The second introduction of a state is typically a memory address register 170 load. This occurs when bit position 0 is a "0" or False and bit position 1 and "1" or True. Bits 2 through $n$ of the ROM word are loaded into the memory address register 170 and the memory address buffer 165 is incremented by one.

D. The third instruction of a state is typically an Input Test and Branch or True or False of a specified input variable. If the variable state agrees with the instructed state (True or False) then the address buffer 165 is loaded with the contents of the ADR register 170 and a branch is made such that the next instruction executed is in memory at that address.

By reference to FIG. 4 a very simple instruction format results. More specifically shown in FIG. 4 is an instruction word residing at any one of the address positions in the ROM. This word is shown by the general numeral 200 and includes at its first position or the previously mentioned bit 0 position as bit 201 which as previously stated has to be high or one in order to test the status lead 161. The task is performed according to the bit position 1 shown herein as bit 202 which sets out either the high or low on the polarity that the instruction desires to meet in order to achieve its test. The remainder of the bits generally designated as bits 203 and corresponding to bit positions 2 through $n$ on the output of the ROM provide the desired input variable that is to meet the test. In the alternative should bit position 1 or bit 201 in this instruction word being coded as 0 the next bit position 202 then provides the routing for the address portion of bits 203 through the aforementioned NAND gates 171 and 175. More specifically if the bit 202 happens to be high in its instruction the ADR register is loaded; if it happens to be low the NAND gate 175 loads the output variable.

By way of these instruction words and the associated vectors a control sequence can be conveniently carried out. An exemplary sequence for servicing the dryer 10 is set forth below, it being understood that any other sequence can be similarly implemented by those skilled in the art:

---
DEFINITIONS:

-continued

| Inputs | Program |
|---|---|
| Start switch 42 | 0010 |
| Stop switch 41 | 0001 |
| Centrifugal switch 22 | 0011 |
| Wired True | 0000 |
| Outputs | |
| Motor solenoid 32 | 0001 |
| Heater solenoid 36 | 0010 |

EXEMPLARY PROGRAM (CONT.)

| Mem. Location | Contents | | Comments |
|---|---|---|---|
| 0000 | OUT | 0000 | Initialize - everything OFF |
| 0001 | LOAD ADR | 0001 | Set up loop for State 1 |
| 0010 | ITBF | 0010 | Branch back to 0011 until start is T |
| 0011 | OUT | 0001 | Begin State 2 - Start motor |
| 0100 | LOAD ADR | 0000 | Set up loop for testing for "STOP" |
| 0101 | ITBT | 0001 | Branch to State 1, if STOP = T |
| 0110 | LOAD ADR | 0100 | Set up loop for State 2 |
| 0111 | ITBF | 0011 | Branch to begin. of State 2 if Cent. SW=F |
| 1000 | OUT | 0011 | Begin State B - Turn on motor and heater |
| 1001 | LOAD ADR | 0000 | Set up loop for testing for "STOP" |
| 1010 | ITBT | 0001 | Branch to State 1 if STOP=T |
| 1011 | LOAD ADR | 0011 | Set up loop to watch centrifugal switch |
| 1100 | ITBF | 0011 | Branch to State 2 if centrifugal switch=F |
| 1101 | LOAD ADR | 1000 | Set up ADR for begin. of State 3 |
| 1110 | ITBT | 0000 | Unconditional branch to State 3 |

The advantages of the systems shown herein are quite numerous. In the first instance all the necessary branching conditions in a sequential controller can be conveniently accommodated by a particular program burn-in in the ROM 150. The mechanics of programming a ROM are quite straightforward, very rarely entail errors or holes, and furthermore are almost free of all manual labor once the programming task has been accomplished. The cost therefore that remains is the cost of the semiconductor of the ROM chip itself with minimal wiring costs or other labor. Furthermore the verification of proper operation can be achieved at the ROM read level by way of a dip clip, for example, without the necessary time of cycling through a whole program. The additional advantages of the disc configuration of logical chips around the ROM 150 is that no arithmetic logic is required. The only logic that even approaches an arithmetic operation is the address increment process around address buffer 165. The implementation of input channel select 160 and in fact the encoding of the output variable out of buffer 155 can be achieved with most convenient chips readily available on the market and adaptable to almost any configuration desired. Thus the main cost of the system is the cost of programming the ROM which in large production batches can be almost totally reduced to an insignificant cost.

Obviously many modifications and variations to the above disclosure can be made without departing from the spirit of the invention. It is therefore intended that the scope of the invention be determined solely on the claims appended hereto.

I claim:

1. A programmable controller adapted to control an automated device, comprising:

a programmable memory adapted to store a plurality of binary words at corresponding addressable locations therein, each word comprising binary bits, bit 0 and 1 containing an operating instruction and bits 2 through n containing a binary address code;

an input selector adapted to receive a plurality of input signals from said device and connected to receive said bits 2 through n for selecting one of said input signals corresponding to said address code on said bits 2 through n;

address buffer means connected to said memory for selecting said addressable locations therein;

output buffer means adapted for connection to said device for applying control signals thereto; and gating means connected to receive said bits 0 and 1 from said memory and a selected one of said input signals from said selector for applying said bits 2 through n to said address or output buffer when said bit 0 is of a first polarity according to the polarity of said bit 1 and for applying said bits 2 through n to said selector when said bit 0 is of a second polarity and loading or incrementing said address buffer means according to the relationship of the polarity of said selected one of said input signals with said bit 1.

2. Apparatus according to claim 1 wherein:

said gating means includes an exclusive OR circuit connected to receive a predetermined combination of said bit 1 and said selected one of said input signals.

3. Apparatus according to claim 2 wherein:

said address buffer means includes an address register connected to receive said bits 2 through n when said bits 0 and 1 are of a first predetermined relationship and an address buffer adapted to receive the contents of said address register when the output signal from said exclusive OR circuit is of a first polarity and to increment said address buffer when said exclusive OR circuit output signal is of a second polarity.

4. Apparatus according to claim 3 wherein:

said output buffer means comprises an output buffer adapted to receive said bjts 2 through n when said bits 0 and 1 are of a second predetermined relationship.

5. Apparatus according to claim 4 wherein:

said memory comprises a read only memory.

6. Apparatus according to claim 4 wherein:

said memory comprises a static random access memory.

7. A programmable device controller comprising:

input selecting means adapted to receive a plurality of input signals from said device for selecting one thereof according to an address code applied thereto;

output buffer means connected for controlled receipt of said address code for producing a plurality of control signals corresponding thereto and adapted to be connected to selected elements of said device;

memory means for storing a plurality of binary words at addressable locations thereof each word including an instruction field adapted to contain four instructions and an address field adapted to contain said address code;

address buffer means connected for controlled receipt of said address code and conformed to increment and load said address code to said address means; and gating means connected to receive said instruction field from said memory means and said selected input signal from said selecting means for alternatively providing an enabling signal to output buffer means, a load signal or an incrementing signal to said address buffer means according to the binary code on said instruction field and said input signal.

8. Apparatus according to claim 7 wherein:
said gating means includes an exclusive OR circuit connected to receive a selected bit from said instruction field and said selected one of said input signals from said selecting means.

9. Apparatus according to claim 8 wherein:
said address buffer means includes an address register connected to receive said address code when said instruction code is in a first binary code group and an address buffer connected to receive the contents of said address register when a selected one bit of said instruction field is in a predetermined first relationship with said exclusive OR circuit output signal and to increment when said selected one bit of said instruction code is in a second predetermined relationship with said exclusive OR circuit output signal.

10. Apparatus according to claim 9 wherein:
said output buffer means comprises an output buffer connected to receive said address code for producing said control signals corresponding thereto when said instruction code is in a second binary code group.

11. Apparatus according to claim 10 wherein:
said memory means comprises a programmable static memory.

12. A programmable device controller adapted to provide control signals to an automated device in response to feedback signals originating therefrom comprising:

memory means having stored therein at respective addressable locations a plurality of binary words each comprising a first field including an instruction code and a second field including an address code; and selection means connected to receive said instruction code and adapted to receive said feedback signals for selecting one of said feedback signals according to said address code when said instruction code is in a first binary code group and incrementing or returning said address code to said memory means according to the polarity of said one feedback signal, or applying said address code to produce said control signals when said instruction code is in a second binary code group.

* * * * *